United States Patent
Cho et al.

(10) Patent No.: US 10,205,349 B2
(45) Date of Patent: Feb. 12, 2019

(54) WIRELESS POWER CONTROLLER AND WIRELESS POWER TRANSMITTER USING THE SAME

(71) Applicant: SAMSUNG ELECTRO-MECHANICS CO., LTD., Suwon-si (KR)

(72) Inventors: Sang Ho Cho, Suwon-si (KR); In Wha Jeong, Suwon-si (KR); Tae Seok Ko, Suwon-si (KR); Hyo Young Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 204 days.

(21) Appl. No.: 15/347,234

(22) Filed: Nov. 9, 2016

(65) Prior Publication Data
US 2017/0279307 A1 Sep. 28, 2017

(30) Foreign Application Priority Data
Mar. 22, 2016 (KR) .................. 10-2016-0034163

(51) Int. Cl.
*H02J 50/12* (2016.01)
*H02J 7/02* (2016.01)
*H02J 50/80* (2016.01)

(52) U.S. Cl.
CPC ............ *H02J 50/12* (2016.02); *H02J 7/025* (2013.01); *H02J 50/80* (2016.02)

(58) Field of Classification Search
CPC ........................................ H02J 50/12
USPC ........................................ 307/104
See application file for complete search history.

(56) References Cited

U.S. PATENT DOCUMENTS

| 4,011,486 A * | 3/1977 | Oulton .................. H01H 47/20 307/129 |
| 8,487,480 B1 * | 7/2013 | Kesler .................. B60L 11/007 307/104 |
| 2012/0068552 A1 | 3/2012 | Nishino |
| 2014/0097697 A1 | 4/2014 | Cho |

FOREIGN PATENT DOCUMENTS

| KR | 10-2014-0043975 A | 5/2012 |
| KR | 10-2014-0043975 A | 4/2014 |
| KR | 10-2015-0076001 A | 7/2015 |

* cited by examiner

*Primary Examiner* — Joseph Chang
(74) *Attorney, Agent, or Firm* — NSIP Law

(57) ABSTRACT

A wireless power transmitter includes a wireless power controller configured to receive an alternating current (AC) voltage, to convert the AC voltage into a direct current (DC) voltage, and to generate an induced current from the DC voltage according to a switching control for a transformer; and a resonator configured to be resonated by the induced current to wirelessly output charging power.

18 Claims, 10 Drawing Sheets

WIRELESS POWER CONTROLLER AND WIRELESS POWER TRANSMITTER USING THE SAME

CROSS-REFERENCE TO RELATED APPLICATION(S)

This application claims the benefit under 35 USC 119(a) of Korean Patent Application No. 10-2016-0034163 filed on Mar. 22, 2016 in the Korean Intellectual Property Office, the entire disclosure of which is incorporated herein by reference for all purposes.

BACKGROUND

1. Field

The following description relates to a wireless power controller and a wireless power transmitter using the same.

2. Description of Related Art

In accordance with the ongoing development of wireless technologies, various wireless functions, for example, ranging from the transmission of data to the transmission of power have been developed. Wireless power charging technology capable of charging an electronic device with power, even in a non-contact state, has recently been developed.

A wireless power charger, according to the related art, receives direct current (DC) power from a power converter that converts commercially available alternating current (AC) power into the DC power to perform wireless charging. However, since a wireless power charger according to the related art requires a separate power converter, there may be a problem in that it may be inconvenient to carry the wireless power charger and a size of the wireless power charger may be substantial.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power transmitter includes a wireless power controller configured to receive an alternating current (AC) voltage, to convert the AC voltage into a direct current (DC) voltage, and to generate an induced current from the DC voltage according to a switching control for a transformer; and a resonator configured to be resonated by the induced current to wirelessly output charging power.

The wireless power controller may include an AC-DC converter configured to receive the AC voltage and to output the DC voltage; a transformer having a primary coil through which an alternating current induced from the DC voltage flows, and configured to output the induced current in which the alternating current is reduced according to a turns ratio of the primary coil and a secondary coil; and a switch configured to perform a switching operation to induce the alternating current in the primary coil from the DC voltage.

The wireless power transmitter may further include a controller configured to adjust either one or both of a switching frequency and a switching duty of the switch in response to a ripple in the DC voltage.

The controller may be further configured to adjust either one or both of the switching frequency and the switching duty of the switch so that amplitude of the alternating current is decreased in response to the DC voltage exceeding a reference level.

The controller may further be configured to adjust either one or both of the switching frequency and the switching duty of the switch so that amplitude of the alternating current is increased in response to the DC voltage being lower than a reference level.

The AC-DC converter may include a rectifier configured to receive the AC voltage and rectify the received AC voltage; and a smoothing capacitor configured to smooth an output of the rectifier, wherein the wireless power transmitter further comprises a resonance capacitor connected to the smoothing capacitor and the primary coil.

The AC-DC converter may include a rectifier configured to receive the AC voltage and rectify the received AC voltage; and a smoothing capacitor configured to smooth an output of the rectifier, wherein the switch may include a first switch having one terminal connected to one terminal of the smoothing capacitor; and a second switch having one terminal connected to the other terminal of the first switch and the other terminal connected to the other terminal of the smoothing capacitor.

One terminal of the primary coil may be connected to the other terminal of the first switch and one terminal of the second switch, and the other terminal of the primary coil may be connected to the other terminal of the second switch and the other terminal of the smoothing capacitor.

According to another general aspect, a wireless power controller includes an AC-DC converter configured to receive an AC voltage and output a DC voltage; a transformer having a primary coil through which an alternating current induced from the DC voltage flows, and configured to output an induced current in which the alternating current is reduced according to a turns ratio of the primary coil and a secondary coil; and a switch configured to perform a switching operation to induce the alternating current in the primary coil from the DC voltage.

The wireless power controller may further include a controller configured to adjust either one or both of a switching frequency and a switching duty of the switch in response to a ripple in the DC voltage.

The AC-DC converter may include a rectifier configured to receive the AC voltage and rectify the received AC voltage; and a smoothing capacitor configured to smooth an output of the rectifier.

The wireless power controller may further include a resonance capacitor connected to the smoothing capacitor and the primary coil.

The switch may include: a first switch including one terminal connected to one terminal of the smoothing capacitor; and a second switch including one terminal connected to the other terminal of the first switch and the other terminal connected to the other terminal of the smoothing capacitor.

One terminal of the primary coil may be connected to the other terminal of the first switch and one terminal of the second switch, and another terminal of the primary coil may be connected to another terminal of the second switch and the other terminal of the smoothing capacitor.

According to another general aspect, a wireless power transmitter, includes a controller configured to adaptively adjust either one or both of a switching frequency and a duty cycle of the switch; a resonance coil wirelessly outputting charging power; and a switch coupling the controller with the resonance coil.

The controller may be further configured to adaptively adjust either one or both of the switching frequency and the duty cycle of the switch in response to a detected ripple.

The wireless power transmitter may further include a transformer interposed between the switch and the resonator coil.

The switch may be coupled to a primary coil of the transformer and be configured to selectively induce a current in a secondary coil of the transformer for provision to the resonator coil.

The wireless power transmitter may further include an alternating current (AC) to direct current (DC) converter, the AC-DC converter being configured to provide a direct current to the transformer and the controller.

According to another general aspect, a method of controlling a wireless power transmitter, includes accepting an alternating current (AC); executing a controller in response to the AC to actuate a switch coupled to a resonator coil to selectively provide a transmission power thereto; and, adaptively adjust either one or both of a switching frequency and a duty cycle of the switch in response to a detected ripple in the transmission power.

A non-transitory computer-readable medium may store instructions that, when executed by a processor, cause the processor to perform the method.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
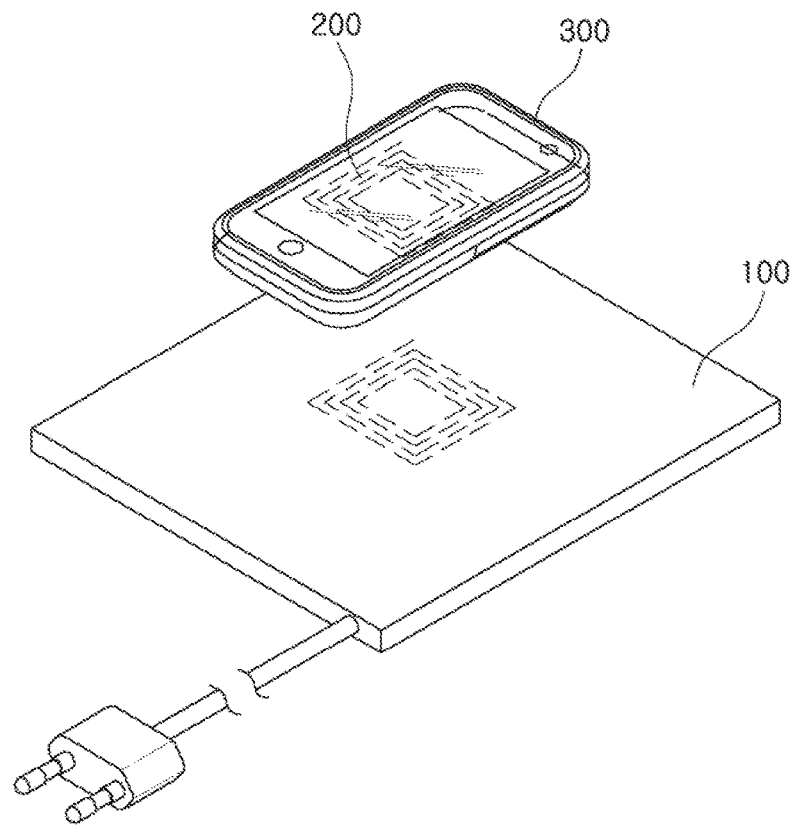
FIG. 1 is a diagram illustrating a wireless power transmitter according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" than the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic views illustrating embodiments of the present disclosure. In the drawings, for example, due to manufacturing techniques and/or tolerances, modifications of the shape shown may be encountered. Thus, embodiments should not be construed as being limited to the particular shapes of regions shown herein but should be understood, for example, to include a change in shape resulting from manufacturing.

The contents described below may have a variety of configurations.

FIG. 1 is a diagram illustrating a wireless power transmitter according to an embodiment.

Referring to FIG. 1, a wireless power receiver 200 is disposed adjacent to a wireless power transmitter 100 to be magnetically coupled (e.g., magnetically resonated or magnetically induced) to the wireless power transmitter 100, thereby wirelessly receiving power, instructions, and/or data.

The wireless power receiver 200 provides the received power to an electronic device 300. The wireless power receiver 200 may be disposed integrally within the electronic device 300 as one component, or be a separate device connected to the electronic device 300.

Although the wireless power receiver 200 and the wireless power transmitter 100 are partially spaced apart from each other in the illustrated example, this is merely illustrative. In fact, the wireless power receiver 200 and the wireless power transmitter 100 may be in contact with each other or may be adjacent to each other.

The wireless power transmitter 100 is operated by directly receiving commercially available alternating current (AC) power. That is, unlike the wireless power transmitter, according to the related art, which requires a power supply converting the commercially available AC power into direct current (DC) power, the wireless power transmitter 100 according to an embodiment may be operated by directly receiving the commercially available AC power. Therefore, the wireless power transmitter 100 has a number of advantages including ease of carrying, reduction in weight, size, volume, cost, materials, losses, Electromagnetic Interference (EMI) noise, waste heat, and an improvement in efficiency of the wireless power transmitter 100.

Hereinafter, various embodiments of the wireless power transmitter 100 which is operated by directly receiving the commercially available AC power will be described with reference to FIGS. 2 through 6.

Figure 2:
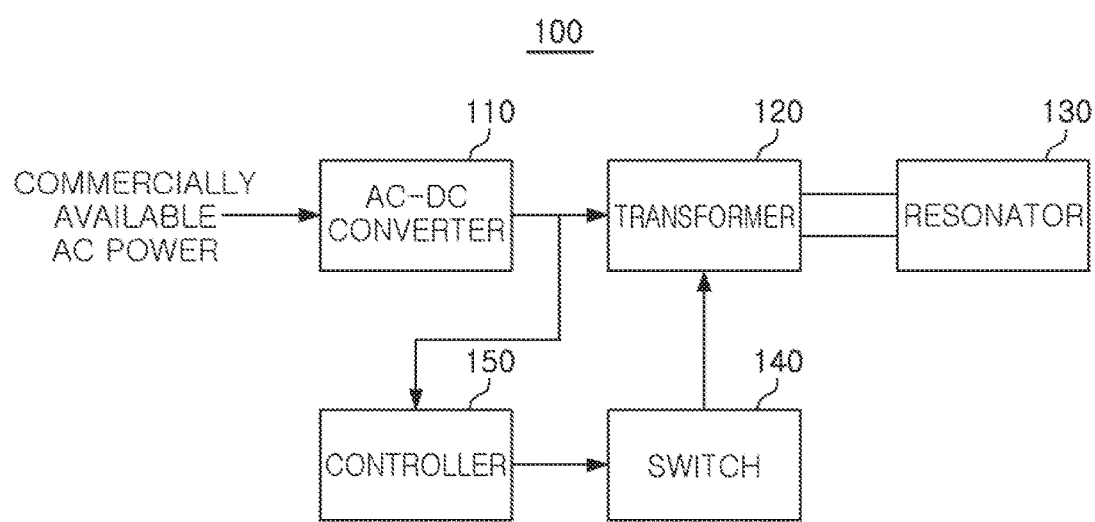
FIG. 2 is a block diagram illustrating the wireless power transmitter according to an embodiment.

FIG. 2 is a block diagram illustrating the wireless power transmitter according to an embodiment.

Referring to FIG. 2, the wireless power transmitter 100 includes a wireless power controller 10 and a resonator 130.

The wireless power controller 10 may be implemented as a separate device or as hardware structurally separable from the resonator 130.

The wireless power controller 10 includes an AC-DC converter 110, a transformer 120, the resonator 130, and a switch 140. According an embodiment, the wireless power controller 10 further includes a controller 150.

The AC-DC converter 110 receives an AC voltage and outputs a DC voltage. For example, the AC-DC converter 110 receives a commercially available AC voltage, and converts the received commercially available AC voltage into the DC voltage.

The transformer 120 includes a primary coil and a secondary coil. An alternating current induced from the DC voltage flows through the primary coil, and an induced current flows in the secondary coil. The induced current corresponds to the alternating current reduced at a ratio according to a turns ratio of the primary coil and the second coil.

The transformer 120 performs a transformation by setting the number of windings of the primary coil and the number of windings of the secondary coil to be different from each other. When the number of windings of the primary coil of the transformer 120 is N1, a voltage of the primary coil is V1, the number of windings of the secondary coil thereof is N2, and a voltage of the secondary coil is V2, the following equation is satisfied.

$$V1/N1 = V2/N2, \quad V2 = V1*(N2/N1) \quad \text{[Equation 1]}$$

When it is assumed that there is no thermal loss, such as in an ideal component, energy is preserved, power input to the primary coil is equal to power output to the secondary coil. Therefore, when an alternating current input to the primary coil is I1, and an induced current induced in the secondary coil is I2, the following equation is satisfied.

$$V1*I1 = V2*I2, \quad I2 = I1*(V1/V2) \quad \text{[Equation 2]}$$

As a result, the induced current I2 induced in the secondary coil is reduced with respect to the alternating current input to the primary coil at a ratio of the voltage of the primary coil to the voltage of the secondary coil.

The resonator 130 is resonated by the alternating current provided from the secondary coil. The resonator 130 is magnetically coupled to a receiving resonator of the wireless power receiver, thereby wirelessly providing the power.

The switch 140 is connected to the primary coil of the transformer 120, and performs a switching operation to induce the alternating current in the primary coil from the DC voltage.

For example, the switch 140 is connected between the primary coil and a ground terminal, and performs the switching operation, thereby generating the alternating current using the DC voltage stored in the AC-DC converter 110.

The controller 150 adjusts a switching frequency or a switching duty of the switch 140 in response to a ripple in the DC voltage. That is, the controller 150 controls an operation of the switch 140 by sensing one or both of the DC voltage and an input to correct the ripple in the DC voltage.

For example, the controller 150 adjusts the switching frequency or the switching duty of the switch 140 so amplitude of the alternating current is decreased when the DC voltage exceeds or meets a reference level.

As another example, the controller 150 adjusts the switching frequency or the switching duty of the switch 140 so the amplitude of the alternating current is increased when the DC voltage is lower than or at the reference level. The precise reference level and logic may change according to the power requirements of the system.

By performing the control as described above, even in a case in which the magnitude of the DC voltage is varied, an output of the resonator 130 is maintained substantially constant.

The controller 150, according to an embodiment is implemented as a processor. According to an embodiment, the controller 150 further includes one or both of a memory and a storage device. For example, the processor includes a central processing unit (CPU), a graphic processing unit (GPU), a microprocessor, an application specific integrated circuit (ASIC), field programmable gate array (FPGA), and may have a single or a plurality of cores. The memory may be a volatile memory (e.g., a random access memory (RAM)), a non-volatile memory (e.g., a read only memory (ROM) or a flash memory), or a combination thereof.

Inasmuch as the wireless power transmitter 100 uses the transformer 120 of which a voltage of an output terminal is decreased, a voltage of the resonator 130 may correspondingly be decreased. As a result, because the wireless power transmitter 100 is more accurately operated even though the number of turns and inductance of the coil of the resonator 130 are small, design convenience, reliability, and efficiency in cost of the wireless power transmitter 100 are advantageously secured.

Figure 3:
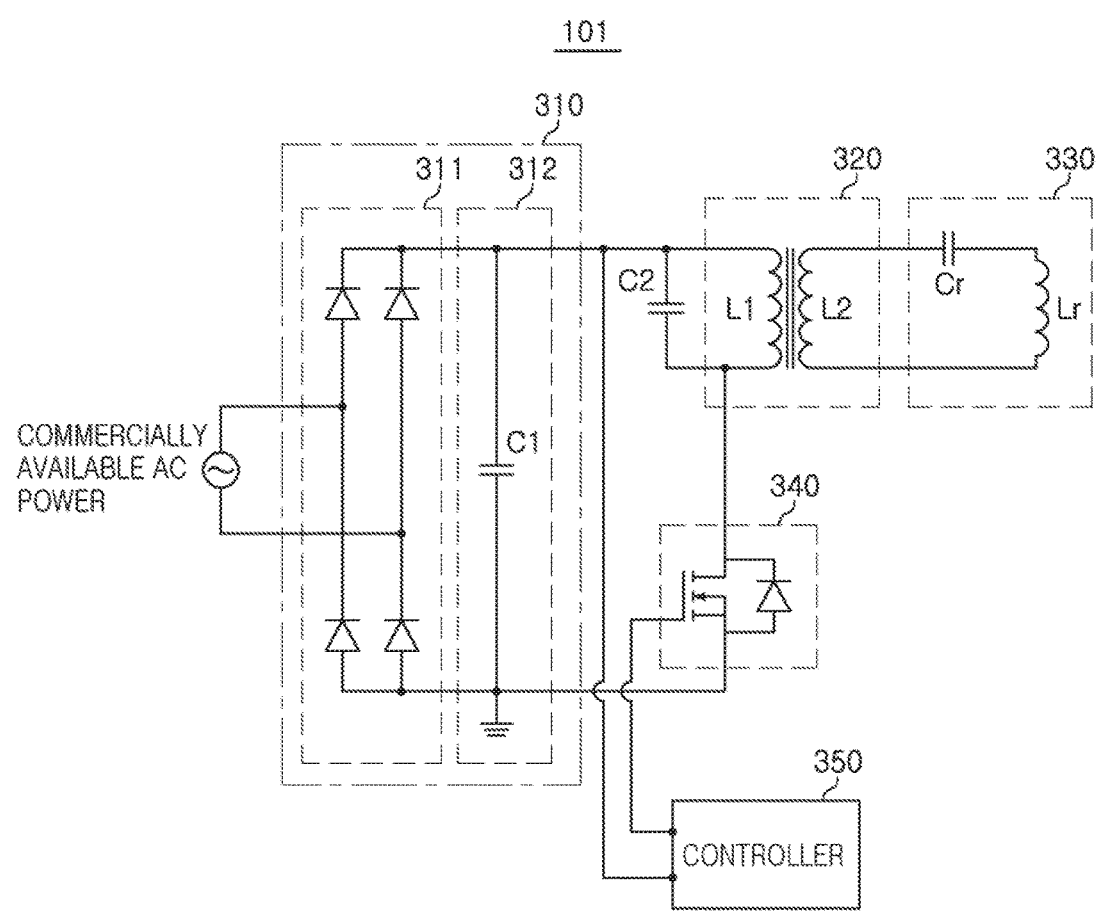
FIG. 3 is a circuit diagram illustrating the wireless power transmitter according to an embodiment.

FIG. 3 is a circuit diagram illustrating the wireless power transmitter according to an embodiment.

Referring to FIG. 3, a wireless power transmitter 101 includes an AC-DC converter 310, a transformer 320, a resonator 330, a switch 340, and a controller 350.

The AC-DC converter 310 includes a rectifier 311 and a smoothing capacitor 312.

The rectifier 311 receives an AC voltage and rectifies the received AC voltage. Although a full-bridge rectifier performing a half-wave rectification of an input signal is illustrated in the illustrated example, various rectification circuits may be applied depending on embodiments.

The smoothing capacitor 312 smooths an output of the rectifier 311. The smoothing capacitor 312 accumulates charge output from the rectifier 311, and outputs a DC voltage.

An alternating current is provided to a primary coil of the transformer 320 in response to a switching operation of the switch 340. That is, as the DC voltage of the smoothing capacitor 312 is provided or is not provided to the primary coil of the transformer 320 in response to the switching operation of the switch 340, the alternating current is responsively induced in the primary coil of the transformer 320.

A resonance capacitor C2 is connected to the smoothing capacitor 312 and the primary coil of the transformer 320. By the resonance capacitor C2, a waveform of the alternating current induced in the primary coil of the transformer 320 in response to the switching operation of the switch 340 may have a shape substantially approaching a sine wave.

The resonator 330 is resonated by the alternating current provided from the secondary coil of the transformer 320. An induced current reduced with respect to the alternating current input to the primary coil at a ratio of a voltage of the primary coil to a voltage of the secondary coil flows in the secondary coil of the transformer 320. Because the resonator 330 is directly connected to the secondary coil of the transformer 320, the induced current flows in the resonator 330. Because the induced current is substantially in a form of the sine wave, the resonator is resonated from the induced current.

The controller 350 is configured to control the switching operation of the switch 340. Because the switch 340 is connected to the primary coil of the transformer 320, and the resonator 330 is resonated by the alternating current induced in the secondary coil of the transformer 320, the controller 350 controls an operation of the resonator 330 by controlling the switching operation of the switch 340. That is, the controller 350 controls the resonator 330 of a secondary side of the transformer 320 by adjusting a switching of a primary side of the transformer 320.

According to an embodiment, the controller 350 detects the output of the smoothing capacitor 312, and adjusts the control of the switch 340 in a feed-forward manner in response to a ripple present in the output of the smoothing capacitor 312. That is, the wireless power transmitter 101 generates the DC voltage using the rectifier 311 and the smoothing capacitor 312, without using a separate power converter. Accordingly, the ripple may occur in the smoothing capacitor due to an external influence and the ripple may correspond to variation of an input of the transformer 320. Therefore, the controller 350 provides a stable operation of the resonator 330 by adjusting the switch 340 in the feed-forward manner in response to the ripple in the DC voltage output from the smoothing capacitor 312.

For example, the controller 350 adjusts a switching frequency or a switching duty of the switch 340 so that a gain of the resonator is decreased when the DC voltage exceeds a reference level.

As another example, the controller 350 adjusts the switching frequency or the switching duty of the switch 340 so that the gain of the resonator is increased when the DC voltage is lower than the reference level.

Figure 4:
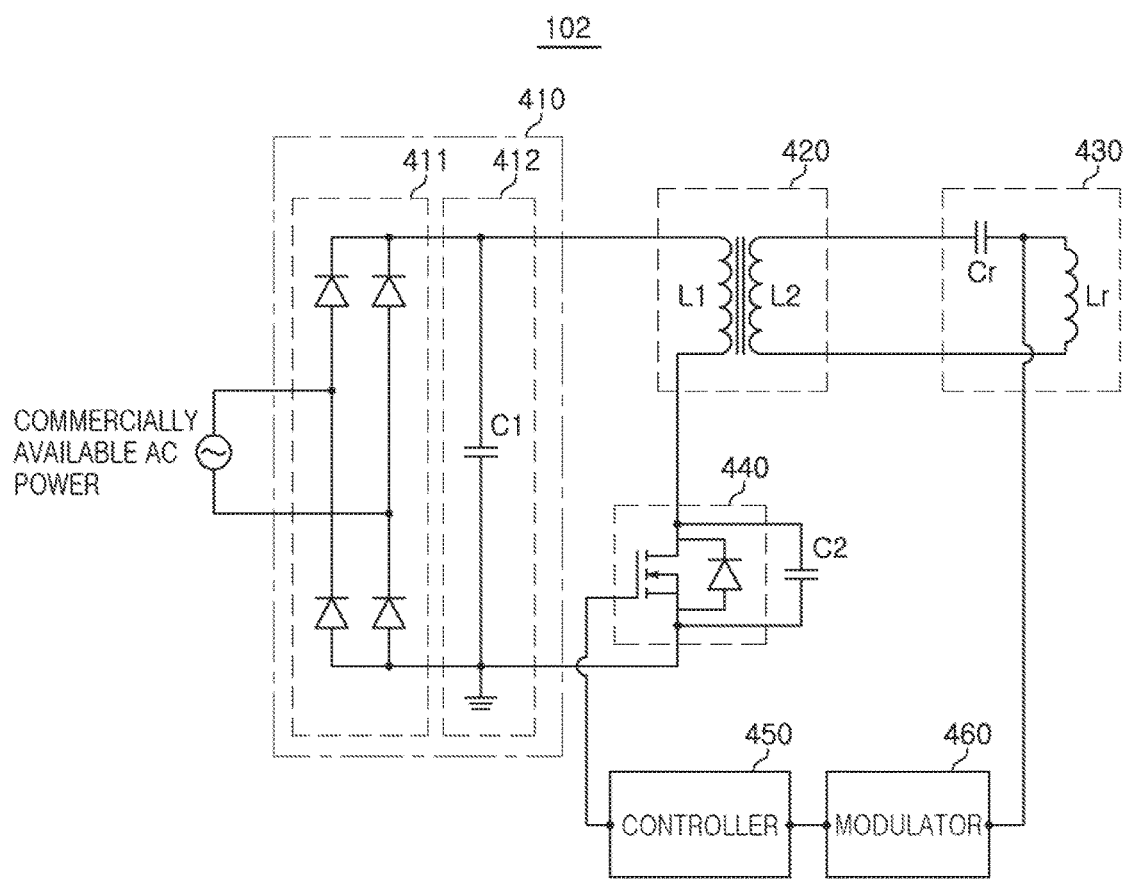
FIG. 4 is a circuit diagram illustrating a wireless power transmitter according to an embodiment.

FIG. 4 is a circuit diagram illustrating a wireless power transmitter according to an embodiment.

Referring to FIG. 4, a wireless power transmitter 102 includes an AC-DC converter 410, a transformer 420, a resonator 430, a switch 440, a controller 450, and a modulator 460.

The AC-DC converter 410, the transformer 420, the resonator 430, the switch 440, and the controller 450 may be understood with reference to the description described above in FIGS. 2 and 3 and a detailed discussion will not be repeated here for clarity and conciseness.

A resonance capacitor C2 is connected across the switch 440. Since the resonance capacitor C2 is operated similarly to the resonance capacitor C2 illustrated in FIG. 3, the resonance capacitor C2 allows an alternating current applied to a primary coil of the transformer 420 in response to an operation of the switch 440 to be formed in a shape of sine wave.

The modulator 460 is connected to the resonator 430 and is configured to modulate an output of the resonator 430. The controller 450 transmits and/or receives information for a wireless charging to or from the wireless power receiver, through the modulator 460.

Figure 5:
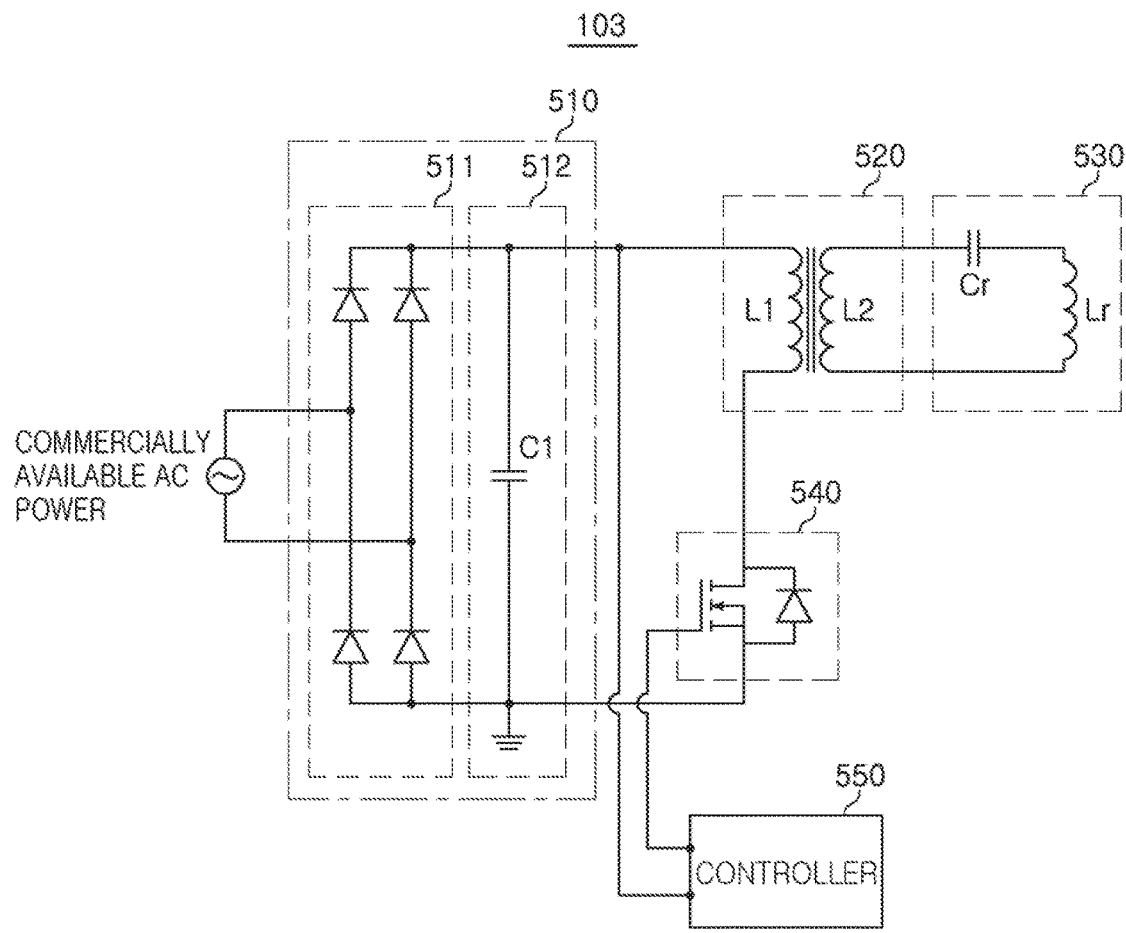
FIG. 5 is a circuit diagram illustrating a wireless power transmitter according to an embodiment.

FIG. 5 is a circuit diagram illustrating a wireless power transmitter according to an embodiment.

A wireless power transmitter 103 illustrated in FIG. 5 illustrates an embodiment in which there is no resonance capacitor e.g. C2. According to the present embodiment, because a shape of alternating current applied to a primary winding of the transformer 520 is close to a square wave, noise may be caused as compared to the embodiments illustrated in FIGS. 3 and 4, but the noise may be partially offset by a transmission by a magnetic coupling of the transformer 520, and a configuration of the wireless power transmitter 103.

An AC-DC converter 510, the transformer 520, a resonator 530, a switch 540, and a controller 550 may be understood from those described with reference to FIGS. 3 and 4.

Figure 6:
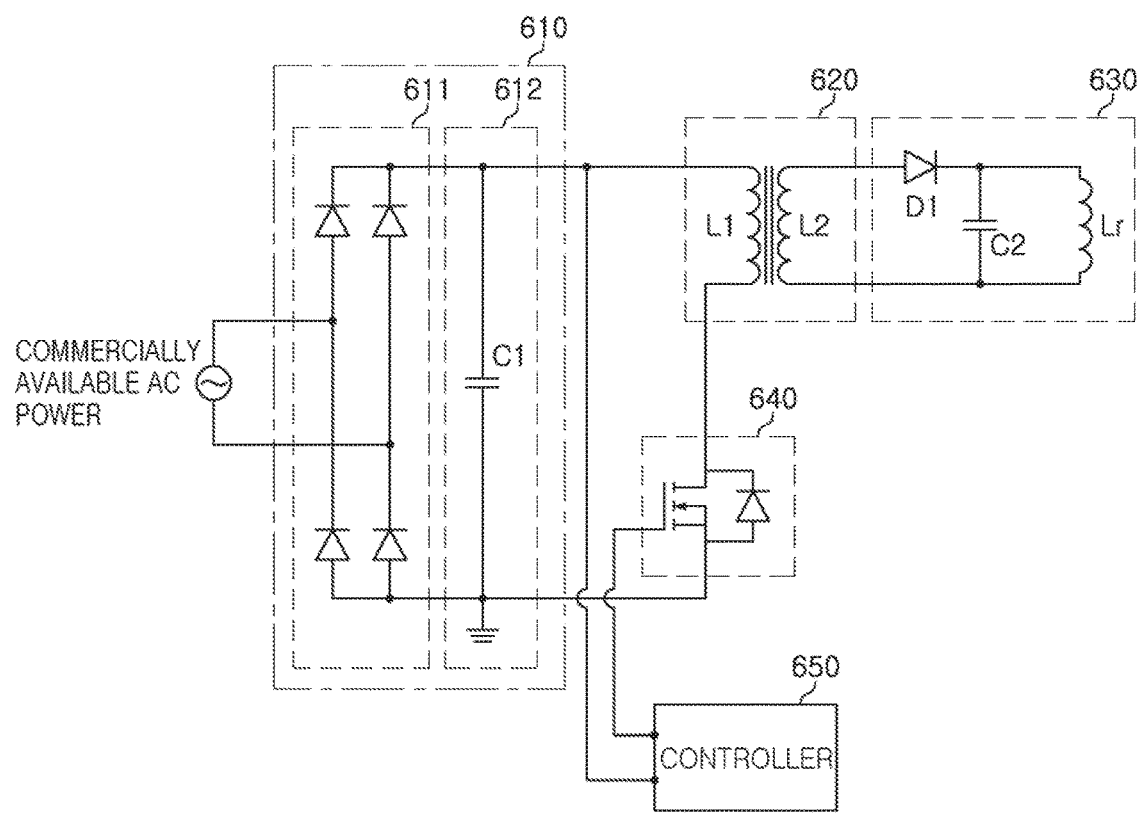
FIG. 6 is a circuit diagram illustrating a wireless power transmitter according to an embodiment.

FIG. 6 is a circuit diagram illustrating a wireless power transmitter according to an embodiment. The wireless power transmitter 104 illustrated in FIG. 6 is related to an embodiment in which the resonance capacitor is omitted, unlike the embodiments illustrated in FIGS. 3 and 4.

The wireless power transmitter 104 includes a diode D1 on a secondary side of a transformer 620, and employs a shunt resonator 630.

Accordingly, even in a case in which an alternating current of a square wave is applied to a primary side of the transformer 620, an alternating current of a substantially sine-shaped wave may be input to the shunt resonator 630, thereby improving performance of the shunt resonator 630.

Figure 7:
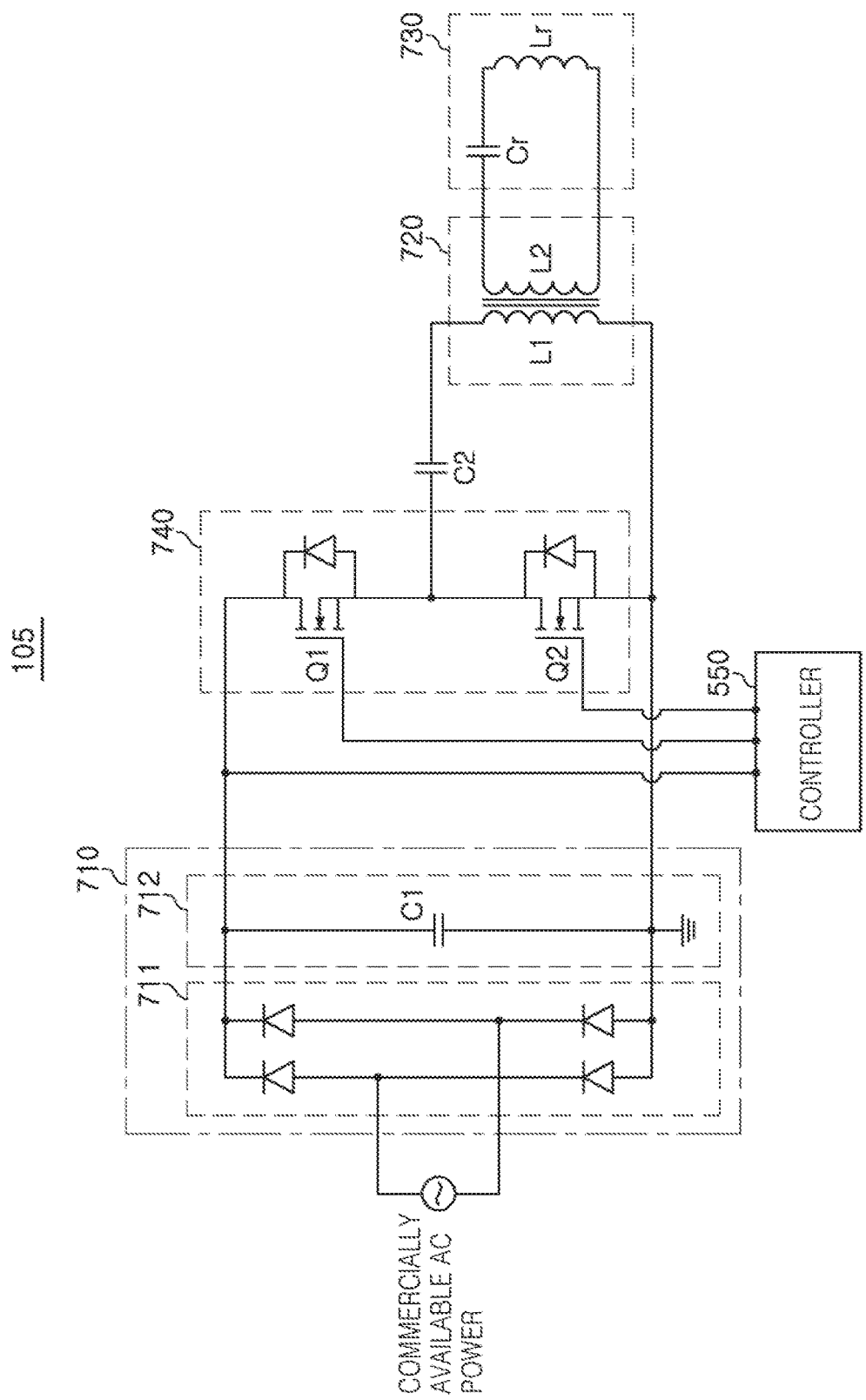
FIG. 7 is a circuit diagram illustrating a wireless power transmitter according to an embodiment.

FIG. 7 is a circuit diagram illustrating a wireless power transmitter according to an embodiment.

A wireless power transmitter 105 illustrated in FIG. 7 is related to an embodiment in which a half-bridge inverter is used as a switch 740.

That is, the switch 740 includes a first switch Q1 of which one terminal is connected to one terminal of a smoothing capacitor 712, and a second switch Q2 of which one terminal is connected to the other terminal of the first switch Q1, and the other terminal is connected to the other terminal of the smoothing capacitor 712.

One terminal of a primary coil of the transformer 720 is connected to the other terminal of the first switch Q1 and one terminal of the second switch Q2. The other terminal of the primary coil of the transformer 720 is connected to the other terminal of the second switch Q2 and the other terminal of the smoothing capacitor 712.

Figure 8:
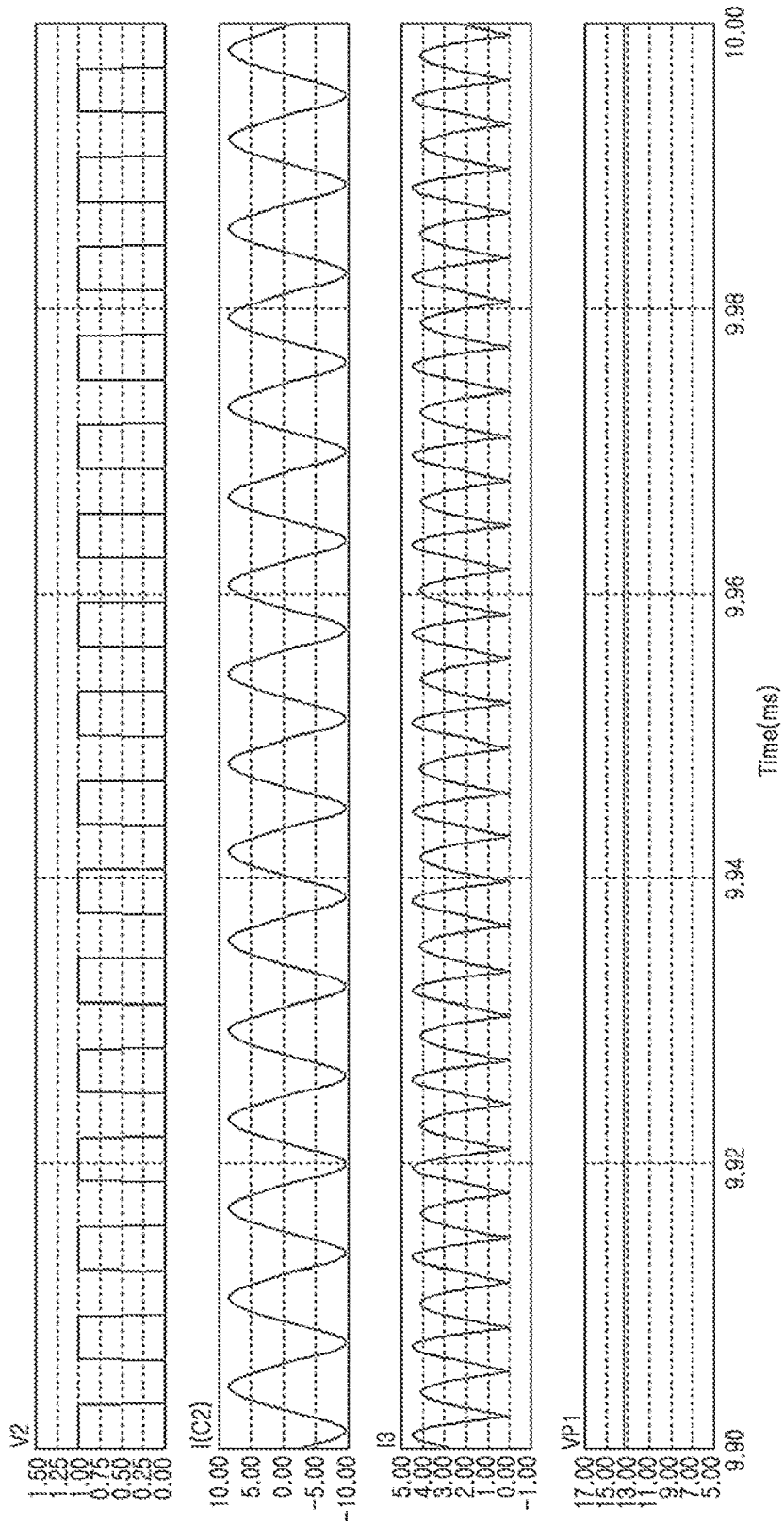
FIGS. 8 and 9 are graphs illustrating output signals according to an example of the wireless power transmitter according to a switching control of a frequency variation manner.
Figure 9:
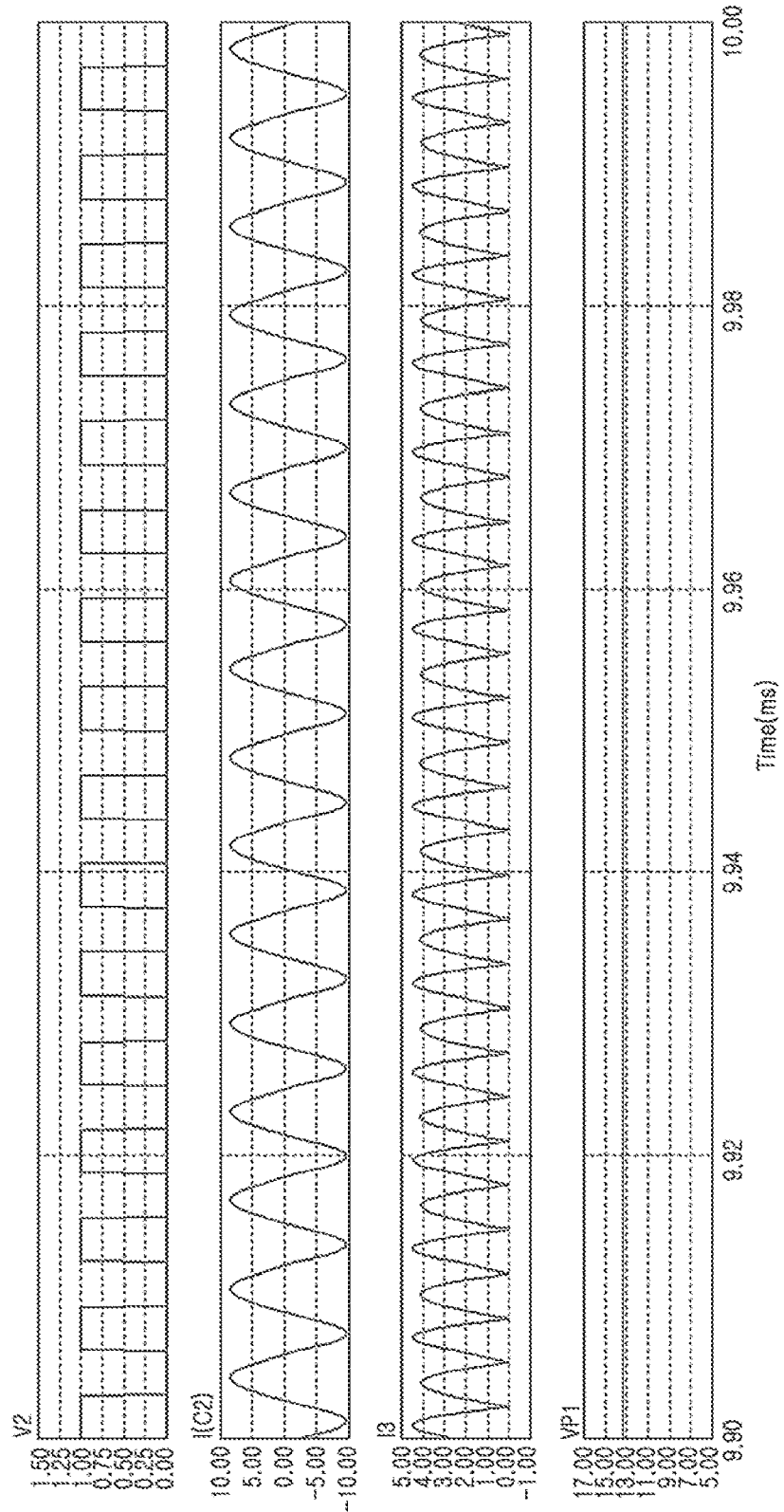

FIGS. 8 and 9 are graphs illustrating output signals according to an example of the wireless power transmitter according to a switching control of a frequency variation manner.

In the present example, an input voltage of the wireless power transmitter is an AC power of 380V corresponding to commercially available AC power. In other examples, 220V, 110V, 12V, 5V, or other suitable voltage may be employed as the commercially available AC power. In the case of transformer, a turns ratio of 50:1 was applied, and a voltage of a secondary side was correspondingly decreased.

FIGS. 8 and 9 illustrate changes in an output voltage and other current waveforms according to a frequency change. A first waveform in FIGS. 8 and 9 illustrates a switching signal of a switch of a primary side of the transformer, a second waveform illustrates a coil current of a resonator, a third waveform illustrates a current of a rectifying terminal of a wireless charging receiver, and a fourth waveform illustrates an output voltage of the wireless charging receiver, respectively.

FIG. 8 illustrates a result when a switching frequency is 200 kHz, and a duty ratio is 50%, and FIG. 9 illustrates a result when the switching frequency is 160 kHz, and the duty ratio is 50%.

It is seen from the example of FIG. 8 that the output voltage is about 9.5V, and it may be seen from the example of FIG. 9 that the output voltage is about 13.2V. Accordingly, it may be seen that the output voltage is normally varied in response to the frequency change for the transformer.

Figure 10:
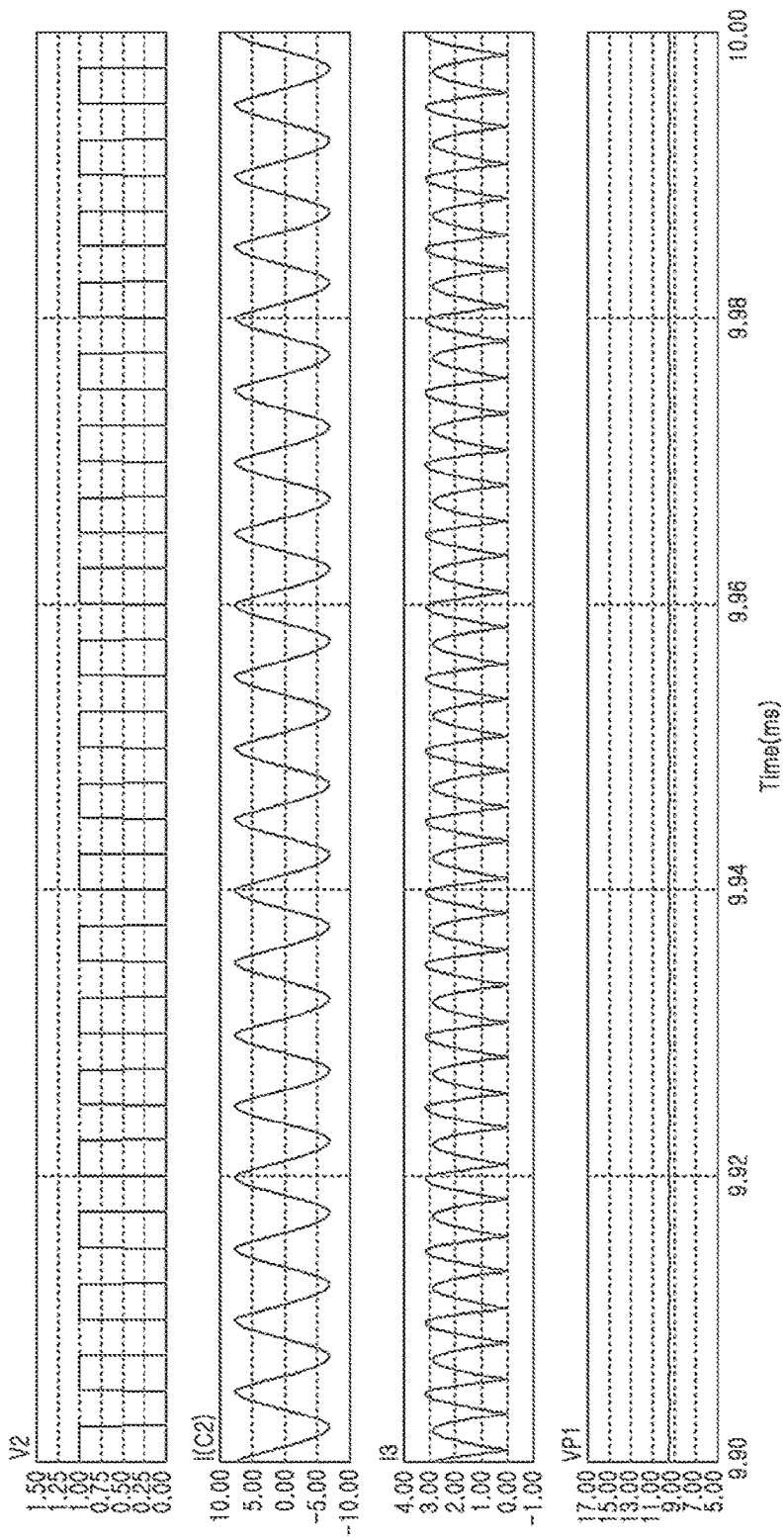
FIGS. 10 and 11 are graphs illustrating output signals (based on a switching control in which frequency is varied, according to an embodiment) of the wireless power transmitter according to a switching control of a frequency variation manner.
Figure 11:
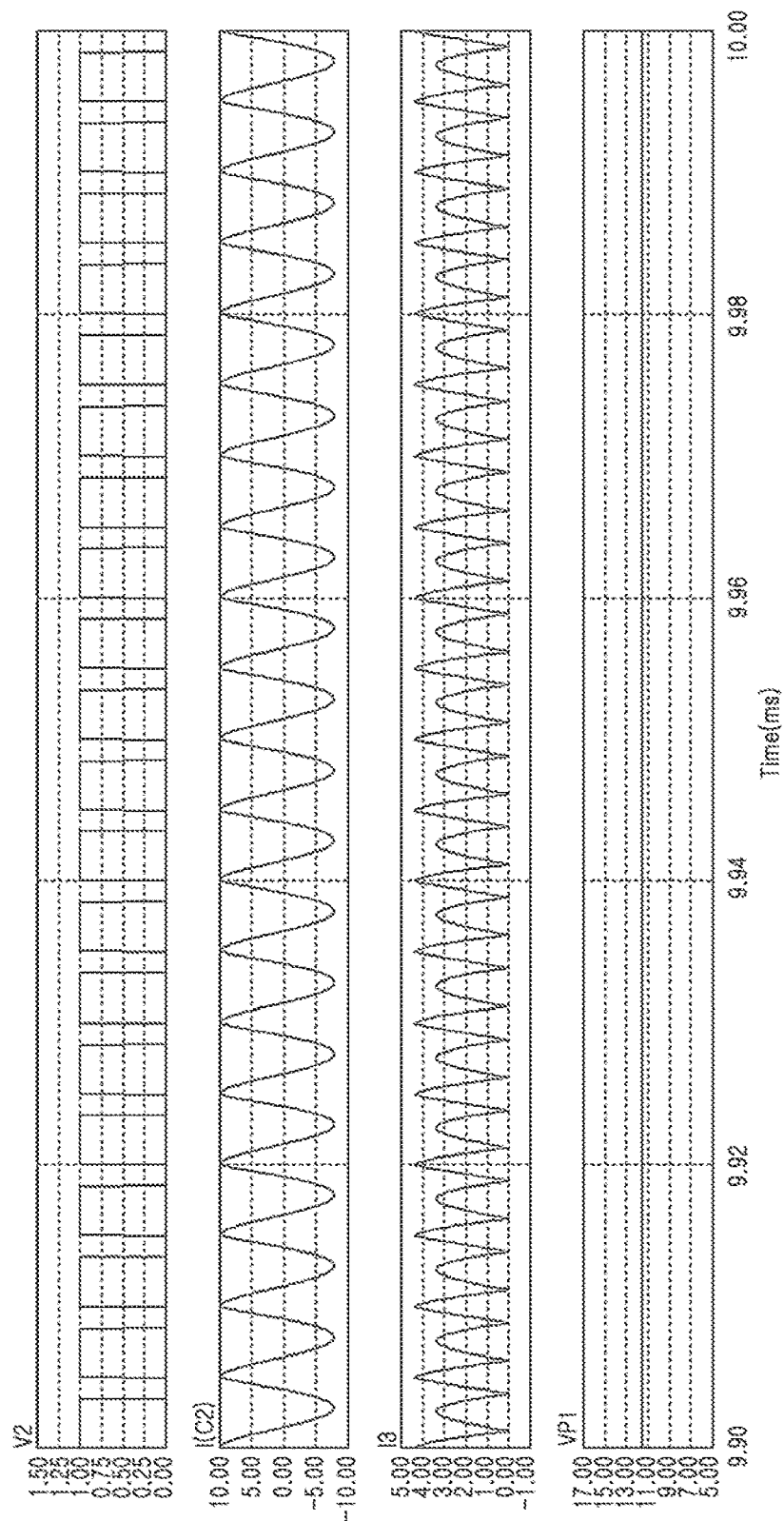

FIGS. 10 and 11 are graphs illustrating output signals according to an example of the wireless power transmitter according to a switching control of a frequency variation manner.

In the present example, an input voltage of the wireless power transmitter is an AC power of 380V corresponding to commercially available AC power. In the case of the transformer, a turns ratio of 50:1 was applied, and a voltage of a secondary side was decreased. Where the commercially available AC is, for example about 110V, a turns ratio of approximately 14:1 may be employed.

FIGS. 10 and 11 illustrate changes in an output voltage and other current waveforms according to a duty ratio change. A first waveform in FIGS. 10 and 11 illustrates a switching signal of a switch of a primary side of the transformer, a second waveform illustrates a coil current of a resonator, a third waveform illustrates a current of a rectifying terminal of a wireless charging receiver, and a fourth waveform illustrates an output voltage of the wireless charging receiver, respectively.

FIG. 10 illustrates a result when a switching frequency is 200 kHz, and a duty ratio is 50%, and FIG. 11 illustrates a result when the switching frequency is 200 kHz, and the duty ratio is 70%.

It is seen from the example of FIG. 10 that the output voltage is about 9.5V, and it is seen from the example of FIG. 11 that the output voltage is about 11.6V. Accordingly, it is seen that the output voltage is varied in response to the duty ratio change for the transformer.

As set forth above, according to the embodiments in the present disclosure, the wireless power transmitter is reliably operated even in a high voltage environment by the commercially available AC power while directly receiving the commercially available AC power to be operated.

The controller 150, 350, 450, 550, 650 and modulator 460 in FIGS. 2-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
   a wireless power controller configured to receive an alternating current (AC) voltage, to convert the AC voltage into a direct current (DC) voltage, and to generate an induced current from the DC voltage according to a switching control for a transformer;
   a resonator configured to be resonated by the induced current to wirelessly output charging power;
   a switch; and
   a switching controller configured to control a switching operation of the switch.

2. The wireless power transmitter of claim 1, wherein the wireless power controller further comprises:
   an AC-DC converter configured to receive the AC voltage and to output the DC voltage;
   a transformer having a primary coil through which an alternating current induced from the DC voltage flows, and configured to output the induced current in which the alternating current is reduced according to a turns ratio of the primary coil and a secondary coil; and
   wherein the switch is configured to perform the switching operation to induce the alternating current in the primary coil from the DC voltage.

3. The wireless power transmitter of claim 2, wherein the switching controller is further configured to adjust either one or both of a switching frequency and a switching duty of the switch in response to a ripple in the DC voltage.

4. The wireless power transmitter of claim 3, wherein the switching controller is further configured to adjust the switching frequency or the switching duty of the switch so that amplitude of the alternating current is decreased in response to the DC voltage exceeding a reference level.

5. The wireless power transmitter of claim 3, wherein the switching controller is further configured to adjust either one or both of the switching frequency and the switching duty of the switch so that amplitude of the alternating current is increased in response to the DC voltage being lower than a reference level.

6. The wireless power transmitter of claim 2, wherein the AC-DC converter comprises:
   a rectifier configured to receive the AC voltage and rectify the received AC voltage; and
   a smoothing capacitor configured to smooth an output of the rectifier, wherein the wireless power transmitter further comprises a resonance capacitor connected to the smoothing capacitor and the primary coil.

7. The wireless power transmitter of claim 2, wherein the AC-DC converter comprises:
a rectifier configured to receive the AC voltage and rectify the received AC voltage; and
a smoothing capacitor configured to smooth an output of the rectifier, wherein
the switch comprises:
a first switch having one terminal connected to one terminal of the smoothing capacitor; and
a second switch having one terminal connected to the other terminal of the first switch and the other terminal connected to the other terminal of the smoothing capacitor.

8. The wireless power transmitter of claim 7, wherein one terminal of the primary coil is connected to the other terminal of the first switch and one terminal of the second switch, and
the other terminal of the primary coil is connected to the other terminal of the second switch and the other terminal of the smoothing capacitor.

9. A wireless power controller, comprising:
an alternating current (AC) to direct current (DC) (AC-DC) converter configured to receive an AC voltage and output a DC voltage;
a transformer having a primary coil through which an alternating current induced from the DC voltage flows, and configured to output an induced current in which the alternating current is reduced according to a turns ratio of the primary coil and a secondary coil;
a switch configured to perform a switching operation to induce the alternating current in the primary coil from the DC voltage; and
a switching controller configured to control the switching operation of the switch.

10. The wireless power controller of claim 9, wherein the switching controller is further configured to adjust either one or both of a switching frequency and a switching duty of the switch in response to a ripple in the DC voltage.

11. The wireless power controller of claim 9, wherein the AC-DC converter comprises:
a rectifier configured to receive the AC voltage and rectify the received AC voltage; and
a smoothing capacitor configured to smooth an output of the rectifier.

12. The wireless power controller of claim 11, further comprising:
a resonance capacitor connected to the smoothing capacitor and the primary coil.

13. The wireless power controller of claim 11, wherein the switch comprises:
a first switch comprising one terminal connected to one terminal of the smoothing capacitor; and
a second switch comprising one terminal connected to the other terminal of the first switch and the other terminal connected to the other terminal of the smoothing capacitor.

14. The wireless power controller of claim 13, wherein one terminal of the primary coil is connected to the other terminal of the first switch and one terminal of the second switch, and
another terminal of the primary coil is connected to another terminal of the second switch and the other terminal of the smoothing capacitor.

15. A wireless power transmitter, comprising:
a switching controller configured to adaptively adjust either one or both of a switching frequency and a duty cycle of a switch;
a resonator coil wirelessly outputting charging power;
a switch coupling the controller to the resonator coil; and
a transformer interposed between the switch and the resonator coil;
wherein the switching controller is configured to control a switching operation of the switch and control a flow of current to the resonator coil.

16. The wireless power transmitter of claim 15, wherein the switching controller is further configured to adaptively adjust either one or both of the switching frequency and the duty cycle of the switch in response to a detected ripple.

17. The wireless power transmitter of claim 15, wherein the switch is coupled to a primary coil of the transformer and is configured to selectively induce a current in a secondary coil of the transformer for provision to the resonator coil.

18. The wireless power transmitter of claim 16, further comprising:
an alternating current (AC) to direct current (DC) converter, the AC-DC converter being configured to provide a direct current to the transformer and the switching controller.

* * * * *